Patented Nov. 20, 1951

2,576,020

UNITED STATES PATENT OFFICE 2,576,020

MANUFACTURE OF PYROMELLITIC ACID

Jan J. A. Knops, Oirsbeek, Netherlands, assignor to De Directie van de Staatsmijnen in Limburg, Heerlen, Netherlands No Drawing. Application August 29, 1950, Serial No. 182,143. In the Netherlands September 17, 1949

10 Claims. (Cl. 260—522)

This invention relates to the manufacture of pyro-mellitic acid by thermal decomposition of higher benzene polycarboxylic acids.

FIELD OF INVENTION

It is known that when mellitic acid (benzene hexacarboxylic acid) and benzene pentacarboxylic acid, which may be obtained in the oxidation of coal, are heated, these products are converted into 1,2,4,5-benzene tetracarboxylic acid, i. e., pyro-mellitic acid. When this decarboxylation is carried out at temperatures of 250 to 400° C. in the presence of water vapor, the reaction product is entrained by the water vapor and the pyro-mellitic acid may be separated from the condensate.

In the normal procedures used in carrying out this type of reaction heretofore, certain disadvantages have always been present and considerable work has been devoted toward the solution of these problems. For example, the yield of desired pyro-mellitic acid has always been somewhat lower than desired. Furthermore, the proper control of the reaction so as to produce the desired product with a minimum of by-product or unseparable impurities has always been difficult.

OBJECTS

A principal object of this invention is the provision of new improvements in the manufacture of pyro-mellitic acid from the higher benzene polycarboxylic acids by thermal decomposition. Another object is the provision of new procedures for the manufacture of pyro-mellitic acid in higher yields from pyro-carboxylic acid than have been possible heretofore. A further object is the provision of new improvements in the subject processes which make it possible to obtain the desired product with less operational difficulties and with the formation of less undesirable by-products and impurities than with the known prior procedures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the manufacture of pyro-mellitic acid from the higher benzene polycarboxylic acids, i. e., the penta and hexacarboxylic acids by first shaping the polycarboxylic acid or mixture of acids into a finely subdivided form, then fluidizing the subdivided acid in a gas stream containing water vapor, heating the acid while maintained in the fluidized state in the gas stream to a temperature between 250 and 450° C. and then recovering pyro-mellitic acid from the gas stream.

Preferably, the shaping of the polycarboxylic acids into the finely subdivided form for use in the invention is carried out by impregnating or coating, or both, of carrier particles, preferably porous carrier particles, with the polycarboxylic acids. Also, the recovery of the desired product from the gas stream is preferably accomplished by first separating the gas stream from the fluidized particles, then condensing the water vapor in the gas stream and removing the pyro-mellitic acid from the condensed water by filtration or the like.

EXAMPLES

The processes discussed herein may be more fully understood by reference to the following illustrative examples (parts and percent as used in these examples are parts by weight and percent by weight):

Example I 30 parts of a crude oxidation product of coal, containing 30 to 35% of higher benzene polycarboxylic acids, are mixed in a dry state with 70 parts of fine pumice (particle size 0.2 to 0.3 mm.). While stirring, the mixture is moistened with 50 parts of water and, subsequently, pre-dried at a temperature of 100° C.

Thereafter, the mixture is introduced into a fluidization compartment, where it is heated at 320° C. in a fluidized state by means of superheated steam. The steam discharged from the fluidization compartment, is condensed and the condensate is treated with hydrochloric acid. In this manner, 8.4 parts of crude pyro-mellitic acid are obtained as a practically white product.

Example II 40 parts of the crude oxidation product mentioned in Example I are deposited on or within 60 parts of a carrier consisting of coke breeze (particle size 0.3 to 0.8 mm.) in the manner described in Example I. The fluidization is carried out at a temperature of 330° C. by means of preheated steam containing 25% by volume of nitrogen. The final product obtained consisted of 11.6 parts crude pyro-mellitic acid.

DETAILED DESCRIPTION

Considerable latitude in the temperature used for the thermal decomposition of the higher polycarboxylic acids is possible. However, by far the most satisfactory results are obtained when the decomposition temperatures are held between 250 and 400° C. Any satisfactory method can be employed for heating the fluidized polycarboxylic acids to this temperature, but preheating the gas stream to this temperature before it is passed into contact with the shaped, finely divided acids appears to give the best results.

Various methods can be employed for shaping the polycarboxylic acid into a finely divided form for use in the process. Thus, the solid acids can be ground or otherwise subdivided in known fashion. However, it has been discovered that by employing a porous carrier, the difficulties which during fluidization are caused by melting polycarboxylic acid particles, are avoided, so that the process according to the invention, preferably carried out as a continuous process, can proceed smoothly. Pulverulent substances, such as crushed pumice, porous stone, alumina, silica gel particles and the like, which may be regenerated by means of calcination, are suitable carrier materials.

The employment of coke breeze as a carrier is of special importance, since this carrier, even when it is charged with the residue of the reaction products may be used as the initial material for the manufacture of mellitic acid without being regenerated.

The amount of carrier to be used may be varied. The fluidization may be effected with an amount of carrier material which is relatively large with respect to the amount of polycarboxylic acids, but preferably, the amount by weight of carrier material is about 1 to 3 times that of the polycarboxylic acid.

The polycarboxylic acids may be deposited on or within the carrier in any appropriate manner. Impregnating the carrier with molten polycarboxylic acid, however, is hindered by the high viscosity of the molten product, so that it is more advantageous to impregnate with a solution of polycarboxylic acid, preferably, an aqueous solution with subsequent removal of the solvent. The impregnated material need not be thoroughly dried since it may be fluidized in a humid condition by the preheated water vapor.

The particular size to which the polycarboxylic acids are shaped, either by grinding or by coating a porous carrier, is not critical. Hence, the exact size employed will depend to some extent upon the form of apparatus used in the fluidizing operation, the rate of gas flow, and the like. However, for most satisfactory results, it has been found an average particle size of between 0.1 and 1.0 mm. is most desirable.

The rate of gas flow of the water vapor containing gas stream is not critical and may be varied, depending upon a large extent upon the apparatus used, the particle size and the shape of the polycarboxylic acids and the like. These limitations are known by those familiar with fluidized operations and, in carrying out the process, according to the invention, the present knowledge on establishing and maintaining a fluidized state may be made use of. Not only single fluidization apparatus, but also devices comprising more than one fluidization compartment, especially those with superposed compartments, may be applied.

If desired, the water vapor used for heating the polycarboxylic acids may be mixed with inert gases, such as nitrogen and/or hydrocarbon-containing gases. The water vapor-volatilizable reaction product is entrained by the gases coming from the fluidization apparatus. After the water vapor has been condensed, part of the pyro-mellitic acid crystallizes while further amounts of pyro-mellitic acid can be separated from the condensate, for instance, by means of hydrochloric acid.

CONCLUSION

The new procedures described above constitute specific improvements in the generally known process of making pyro-mellitic acid from the higher benzene polycarboxylic acid through thermal decomposition. Utilizing these new improvements in this field, it is possible to produce pyro-mellitic acid in greater yields than has been possible heretofore and, at the same time, eliminate difficulties in carrying out the operation and the formation of undesirable by-products and impurities.

I claim:

1. A process for the manufacture of pyro-mellitic acid which comprises providing a quantity of a polycarboxylic acid from the group consisting of benzene penta- and hexacarboxylic acids, applying said acid to a finely divided inert solid material to provide a plurality of solid particles carrying said acid, fluidizing said particles in a gas stream containing water vapor, heating said particles to a temperature between 250° and 400° C. while fluidized in the gas stream and thereafter recovering pyro-mellitic acid from the gas stream.

2. A process for the manufacture of pyro-mellitic acid which comprises providing a quantity of a polycarboxylic acid from the group consisting of benzene penta- and hexacarboxylic acids, coating a finely subdivided inert solid material with a layer of said polycarboxylic acid, fluidizing said coated particles in a gas stream containing water vapor, heating the particles and coating to a temperature between 250 and 400° C. while fluidized in the gas stream, condensing water vapor from the gas stream subsequent to separation from the said particles and recovering pyro-mellitic acid from the condensed water.

3. A process for the manufacture of pyro-mellitic acid which comprises coating an inert pulverulent porous carrier with a mixture of benzene carboxylic acids of the formula

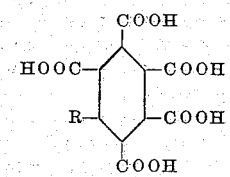

wherein R is a radical from the group —H and —COOH, fluidizing the coated carrier particle in a stream of steam superheated to between 250 and 400° C., separating the steam from the particles, condensing said steam, and recovering pyro-mellitic acid from the resulting aqueous mixture.

4. A process as claimed in claim 3, wherein said benzene carboxylic acid is benzene hexacarboxylic acid.

5. A process as claimed in claim 3, wherein said carrier has an average particle size of 0.1 to 1.0 mm.

6. A process as claimed in claim 3, wherein said coating is accomplished by moistening the carrier with a solution of said polycarboxylic acid and subsequently drying the coated particles.

7. A process as claimed in claim 3, wherein said carrier is coke breeze.

8. A process as claimed in claim 3, wherein said carrier is pumice.

9. A process as claimed in claim 3, wherein said carrier is alumina.

10. A process as claimed in claim 3, wherein said carrier is between 1 and 3 times by weight of said benzene polycarboxylic acid.

JAN J. A. KNOPS.

REFERENCES CITED

The following references are of record in the file of this patent:

UNITED STATES PATENTS

| Number | Name | Date |
|---|---|---|
| 1,714,956 | Jaeger | May 28, 1929 |

FOREIGN PATENTS

| Number | Country | Date |
|---|---|---|
| 262,101 | Great Britain | May 22, 1928 |
| 291,326 | Great Britain | May 22, 1928 |